US009980558B2

(12) United States Patent
Goetz et al.

(10) Patent No.: US 9,980,558 B2
(45) Date of Patent: May 29, 2018

(54) ROLLER BRUSH MOUNTING ASSEMBLY

(71) Applicant: John Bean Technologies Corporation, Chicago, IL (US)

(72) Inventors: Robert R. Goetz, Garden Grove, CA (US); Jonathan Michael Stokes, Clovis, CA (US)

(73) Assignee: John Bean Technologies Corporation, Chicago, IL (US)

( * ) Notice: Subject to any disclaimer, the term of this patent is extended or adjusted under 35 U.S.C. 154(b) by 0 days. days.

(21) Appl. No.: 15/622,866

(22) Filed: Jun. 14, 2017

(65) Prior Publication Data
US 2017/0303676 A1   Oct. 26, 2017

Related U.S. Application Data

(63) Continuation-in-part of application No. 14/970,129, filed on Dec. 15, 2015.

(51) Int. Cl.
*F16M 11/00* (2006.01)
*A46B 17/02* (2006.01)
(Continued)

(52) U.S. Cl.
CPC ............. *A46B 17/02* (2013.01); *A23N 12/02* (2013.01); *A46B 13/02* (2013.01); *F16B 17/00* (2013.01); *A46B 2200/3073* (2013.01)

(58) Field of Classification Search
CPC ....... Y10T 279/17769; Y10T 279/1008; Y10T 408/95; Y10T 409/30952; Y10T 279/1045; Y10T 83/9481; Y10T 279/17923
(Continued)

(56) References Cited

U.S. PATENT DOCUMENTS 1,190,383 A   7/1916   Court
1,543,411 A   6/1925   Wittig
(Continued)

FOREIGN PATENT DOCUMENTS

DE   197 14 181 A1   10/1998
EP   0 310 942 A1    9/1988
(Continued)

OTHER PUBLICATIONS

International Search Report and Written Opinion dated Mar. 27, 2017, issued in corresponding International Application No. PCT/US2016/065785, filed Dec. 9, 2016, 13 pages.
(Continued)

*Primary Examiner* — Steven M Marsh
(74) *Attorney, Agent, or Firm* — Christensen O'Connor Johnson Kindness PLLC

(57) ABSTRACT

A mounting assembly 100 for mounting a roller brush 12 onto a cleaning apparatus includes a mounting flange 102 and an end cap 104 interconnected together by extension springs 176 spanning therebetween. An idle shaft 106 is slidably mounted in the mounting flange 102 by a bearing interface 108. The distal end of the idle shaft 106 is fixed to the end cap 104 so that the springs 176 that urge the end cap 104 into engagement with the mounting flange 102 also bias the idle shaft to extend forwardly of the mounting flange while also permitting the idle shaft to retract to facilitate assembly and disassembly of the roller brush with the mounting assembly 100. The bearing interface 108 is designed to permit the projecting proximal end of the idle shaft to tilt upwardly to facilitate engagement with and disengagement from the roller brush 12.

20 Claims, 15 Drawing Sheets

(51) Int. Cl.
*F16B 17/00* (2006.01)
*A46B 13/02* (2006.01)
*A23N 12/02* (2006.01)

(58) Field of Classification Search
USPC .................................. 248/110; 279/2.03, 77
See application file for complete search history.

(56) References Cited

U.S. PATENT DOCUMENTS

| | | | |
|---|---|---|---|
| 2,472,184 A | 6/1949 | Anest | |
| 2,548,534 A | 4/1951 | Hutchison, Jr. | |
| 2,686,683 A | 8/1954 | Fausel | |
| 3,189,340 A | 6/1965 | Desel | |
| 4,674,172 A | 6/1987 | Botimer | |
| 4,850,765 A | 7/1989 | Ramunas | |
| 5,203,259 A * | 4/1993 | Miedema | A23N 15/02 492/36 |
| 5,780,088 A | 7/1998 | Zittel et al. | |
| 5,868,400 A | 2/1999 | Davis | |
| 6,343,901 B2 | 2/2002 | Wheeler et al. | |
| 6,710,357 B1 | 3/2004 | Schweitzer | |
| 7,540,058 B1 | 6/2009 | Day | |
| 7,849,999 B1 | 12/2010 | Cooley et al. | |
| 8,763,815 B2 | 7/2014 | Pellenc et al. | |
| 9,265,279 B2 * | 2/2016 | Le Neve | A01D 46/285 |
| 9,452,448 B2 * | 9/2016 | Dettmer | A01D 33/04 |
| 9,511,164 B2 | 12/2016 | Dayton | |
| 9,579,692 B2 * | 2/2017 | Le Neve | A01D 46/285 |
| 2009/0057208 A1 | 3/2009 | Pellenc et al. | |

FOREIGN PATENT DOCUMENTS

| | | |
|---|---|---|
| EP | 1 018 306 A1 | 7/2000 |
| WO | 03/089188 A1 | 10/2003 |

OTHER PUBLICATIONS

Invitation to Pay Additional Fees and, Where Applicable, Protest Fee from the International Searching Authority dated Sep. 27, 2017, issued in corresponding International Application No. PCT/US2017/037513, filed Jun. 14, 2017, 10 pages.

* cited by examiner

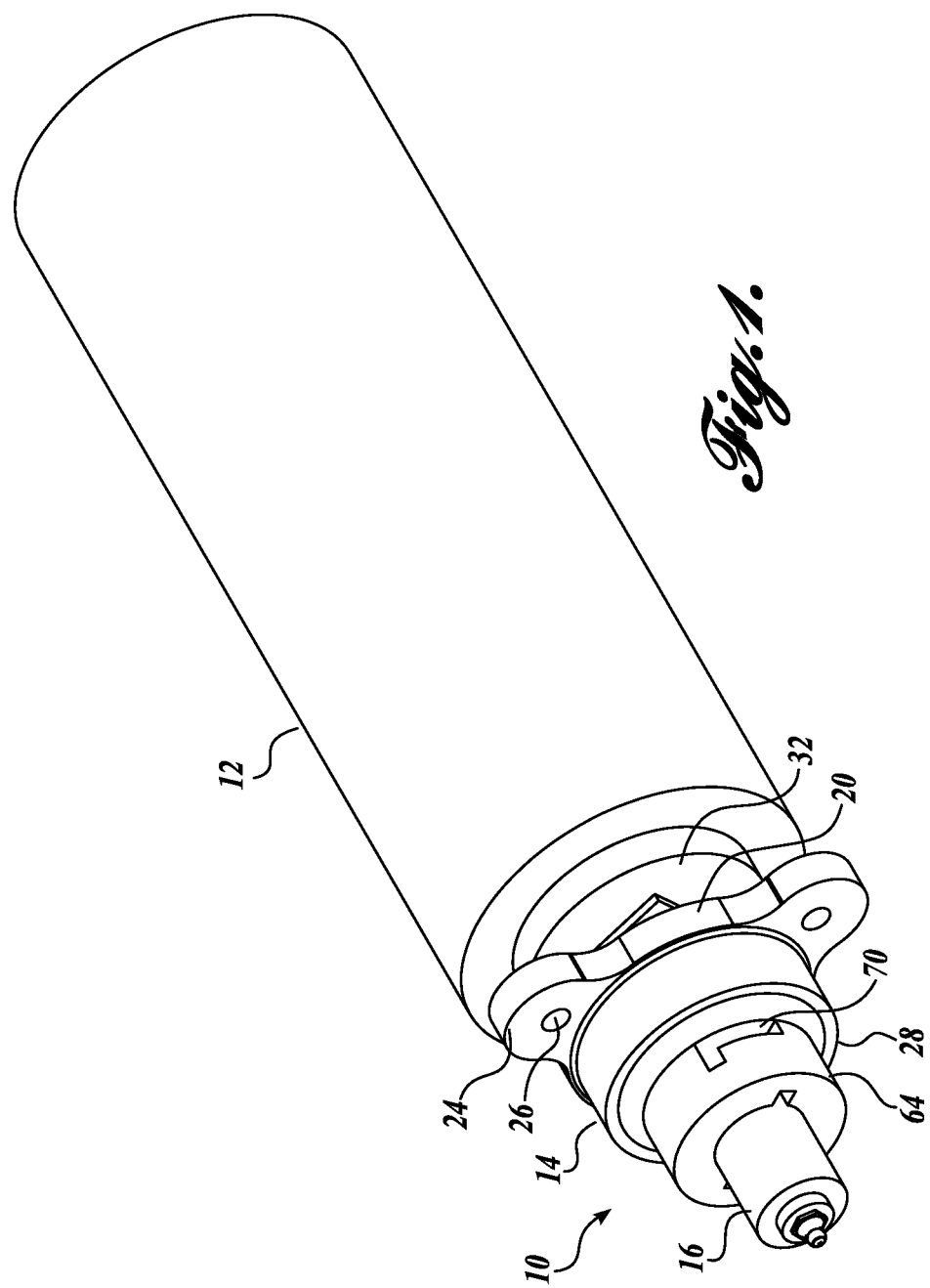

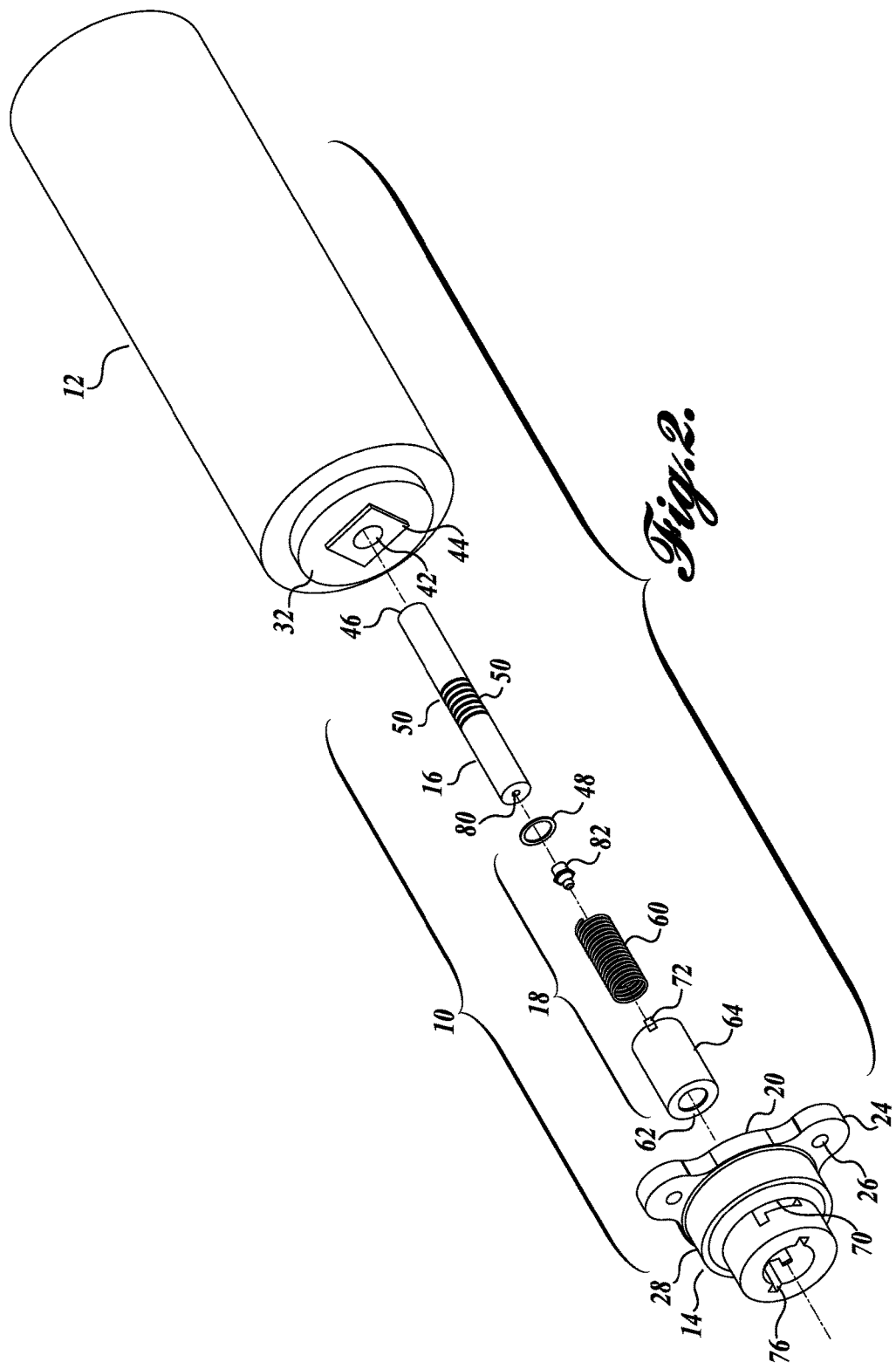

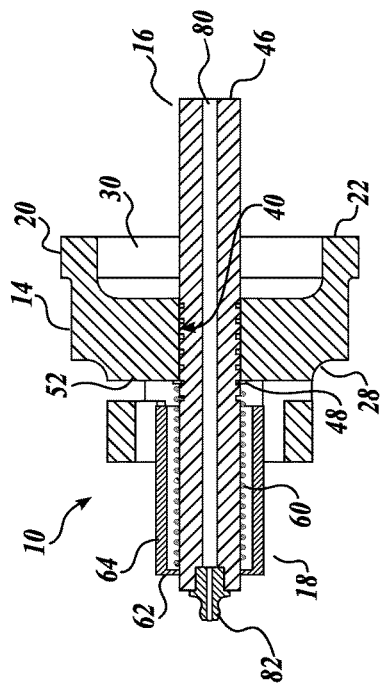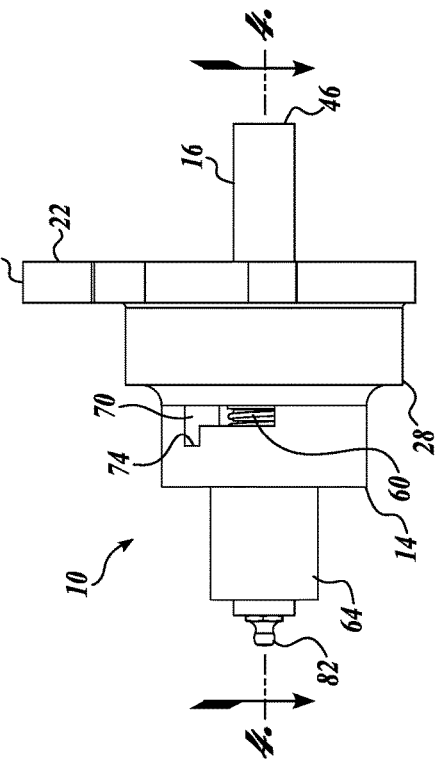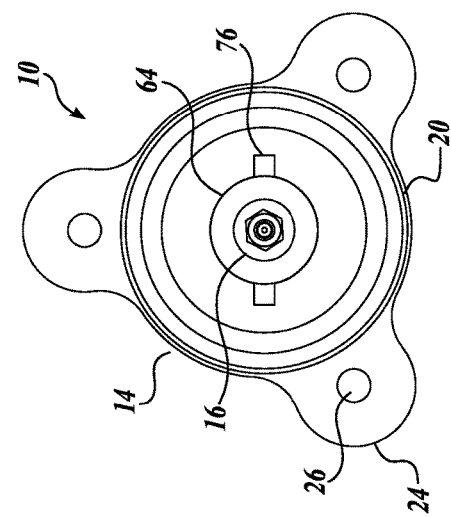

ROLLER BRUSH MOUNTING ASSEMBLY

BACKGROUND

As safety in food processing becomes more strict, there is an increasing need and requirement for processors of produce, fruits, and other types of foods, to clean all equipment surfaces and components that touch food during processing. Machines filled with roller brushes are commonly used to clean produce and fruit once harvested. Typically there are a large number of brushes mounted on the machine side-by-side to each other and in close proximity to each other, thereby to cooperatively form a bed of brushes on which the produce or fruit travel while being cleaned by the rotating brushes.

Periodically, the roller brushes must be removed from the machines for cleaning of the brushes or for replacement of broken or otherwise damaged brushes. This usually requires multiple personnel and is time consuming and difficult. Removing the brushes from the machine drive system often requires removal of machine panels, loosening of bolts or other fasteners, and disassembly of a drive or idler shaft to remove the brush from the cleaning machine.

The present disclosure addresses the need for efficiently installing and removing food (including produce/fruit), cleaning roller brushes from a cleaning apparatus.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A mounting assembly for mounting a roller brush on a cleaning apparatus, wherein the roller brush has an end structure with a longitudinal blind bore formed therein, the mounting assembly including a mounting housing configured to be mountable on the cleaning apparatus. A longitudinal hole extends at least partially through the mounting housing to receive an idle shaft. The idle shaft projects from the mounting housing to support the adjacent end of the roller brush. In this regard, the idle shaft extends into the blind bore formed in the brush end structure.

Further, a loader assembly imposes a load on the idle shaft to urge the idle shaft into engagement with the longitudinal bore of the brush end structure, while also enabling the idle shaft to retract relative to the mounting structure in a direction opposite to the direction of engagement of the idle shaft with the longitudinal bore of the brush end structure under the movement of the roller brush toward the mounting housing.

By the foregoing structure, roller brushes may be installed on the cleaning apparatus by simply engaging the blind bore of the brush end structure over the idle shaft and then pushing the brush horizontally toward the mounting assembly, thereby causing the idle shaft to retract in the direction of the mounting housing. This enables the opposite end of the roller brush to be aligned and engaged with a drive mechanism employed to rotatably drive the roller brush. The force of the loader assembly will maintain the roller brush in secure engagement with its drive mechanism.

To remove the roller brush, the brush need only be pushed horizontally toward the housing until the opposite end of the roller brush disengages from its drive mechanism so that such opposite end can be swung sufficiently clear of the drive mechanism and thereafter enable the brush to be shifted or moved sufficiently away from the mounting structure to disengage the idle shaft from the brush end hub.

In accordance with a further aspect of the present disclosure, a stop is provided to limit the distance that the idle shaft projects from the mounting housing into engagement with the longitudinal bore of the brush end structure.

In accordance with a further aspect of the present disclosure, the mounting housing is constructed with a recess for receiving the adjacent end structure of a roller brush.

In accordance with a further aspect of the present disclosure, the loader assembly applies a resilient load on the idle shaft along the length of the idle shaft in the direction towards the brush end structure.

In accordance with a further aspect of the present disclosure, the loader assembly includes a spring acting on the idle shaft to urge the idle shaft into engagement with the longitudinal bore of the brush end structure. The spring also enables the idle shaft to retract relative to the mounting housing under the movement of the roller brush toward the mounting housing.

In accordance with a further aspect of the present disclosure, the loader assembly also includes a loader housing extending from the mounting housing for engaging over the spring, which in turn is engaged over a corresponding section of the idle shaft, the loader housing providing an abutment for the distal end of the spring.

In accordance with a further aspect of the present disclosure, the loader housing is configured to be removably attachable to the mounting housing.

In accordance with a further aspect of the present disclosure, the loader assembly includes a retainer engageable with the idle shaft. The retainer is configured to bear against the proximal end of the spring, whereby the spring urges the idle shaft into engagement with the longitudinal bore of the brush end structure.

In accordance with a further aspect of the present invention, the idle shaft has portions defining a longitudinal bore extending therethrough, the bore adapted to hold lubricant therein. A system is provided for introducing lubricant into the longitudinal bore of the idle shaft.

In a further embodiment to the present disclosure, a mounting assembly for mounting a roller brush on a cleaning apparatus, wherein the roller brush has an end structure with a blind bore formed therein, the mounting assembly including a housing for mounting the roller brush on the cleaning apparatus. The housing comprising the mounting portion configured to be mountable on the cleaning apparatus and the retractable end portion detachably engageable with the mounting portion. A shaft is attached to the end portion and extends through the mounting portion. The shaft has a proximal end projecting from the mounting portion for engagement with a bore of the brush end structure. A loader loads the housing end portion toward the mounting portion thereby to urge the proximal end of the shaft to project from the mounting portion.

Further, the loader is configured to permit the shaft to retract towards the mounting portion in a direction opposite to the direction that the shaft engages with the brush end structure.

By the foregoing structure, roller brushes may be installed on the cleaning apparatus by simply engaging the blind bore of the brush end structure over the shaft and then pushing the brush toward the mounting assembly thereby causing the shaft to retract in the direction of the housing. This permits the opposite end of the roller brush to be aligned and engaged with a drive mechanism employed to rotatably drive the roller brush. The force of the loader maintains the roller brush in secure engagement with its drive mechanism.

To remove the roller brush, the brush need only be pushed horizontally toward the housing until the opposite end of the roller brush disengages from its drive mechanism. Then such opposite end can be swung clear of the drive mechanism and thereby enable the brush to be retracted away from the mounting portion to disengage the brush end hub from the shaft.

In accordance with a further aspect of the present disclosure, the shaft is longitudinal in structure and the loader applies a resilient load on the shaft along the length of the shaft in the direction of engagement of the shaft with the brush end structure.

In accordance with a further aspect of the present invention, the loader comprises at least one spring acting between the end portion and the mounting portion to urge the shaft toward the brush end structure.

In accordance with a further aspect of the present invention, the at least one spring acts to enable the shaft to retract relative to the mounting housing under the movement of the roller brush toward the mounting housing.

According to a further aspect of the present disclosure, an interface is disposed between the mounting portion and the shaft, with the interface configured to slidably receive the shaft and permit the shaft to swivel laterally relative to the length of the shaft.

In accordance with a further aspect of the present disclosure, the interface comprises a bearing seated with a mounting portion, the bearing shaped to swivel about an axis transverse to the length of the idle shaft.

In accordance with a further aspect of the present disclosure, the shaft is restrained to allow its proximal end to swivel upwardly but not downwardly.

In a further embodiment of the present disclosure, a mounting assembly for mounting a roller brush on a food cleaning apparatus, with the roller brush having an end structure with the blind bore of a depth formed in the end structure, the mounting assembly comprising a housing is configured for mounting on a food cleaning apparatus, a shaft having a proximal end projects from the housing toward the end structure of the roller brush, the proximal end is engageable with the blind bore, an interface is disposed between the shaft and the housing for supporting the shaft, a loader is associated with the housing to resiliently bias the proximal end of the shaft toward the end structure, and wherein the interface is configured to allow the proximal end of the shaft to tilt upwardly for engagement with and disengagement from the end structure of the roller brush.

By the foregoing structure, when the roller brushes are installed on the cleaning apparatus are removed from the cleaning apparatus, the distal end of the shaft is able to tilt upwardly thereby to facilitate engagement of the proximal end of the shaft with the blind bore when the opposite end of the roller brush is tilted upwardly with respect to the drive mechanism for the roller brush.

In accordance with a further aspect of the present disclosure, the interface includes a rotatable bearing configured to slidably receive the shaft and permitting the shaft to slide longitudinally along its length relative to the bearing, with the bearing rotatable about an axis transversely to the length of the shaft.

In accordance with a further aspect of the present disclosure, the housing includes a mounting portion configured for mounting to the food cleaning apparatus, with the mounting portion also configured to receive and retain the interface therein. In addition, an end cap is secured to be detachably secured to the shaft. Further, the loader resiliently attaches the end cap to the mounting portion thereby to bias the proximal end of the idle shaft to project from the mounting portion of the end structure of the roller brush.

In accordance with a further aspect of the present disclosure, the loader comprises at least one spring extending between the mounting flange and the end cap.

In accordance with a further aspect of the present disclosure, the end cap is securable to the shaft at selected locations along the length of the shaft thereby to alter the distance that the proximal end of the shaft projects from the mounting portion.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is an isometric view of a roller brush mounting assembly of one embodiment of the present disclosure shown assembled with a roller brush;

FIG. 2 is an isometric, exploded view of FIG. 1 illustrating the components of the roller brush mounting assembly of the present disclosure;

FIG. 3 is a side elevational view of the roller brush mounting assembly shown in FIGS. 1 and 2;

FIG. 4 is a cross-sectional view of FIG. 3 taken along lines 4-4 thereof;

FIG. 5 is an end view of FIG. 3;

DETAILED DESCRIPTION

Figure 6:
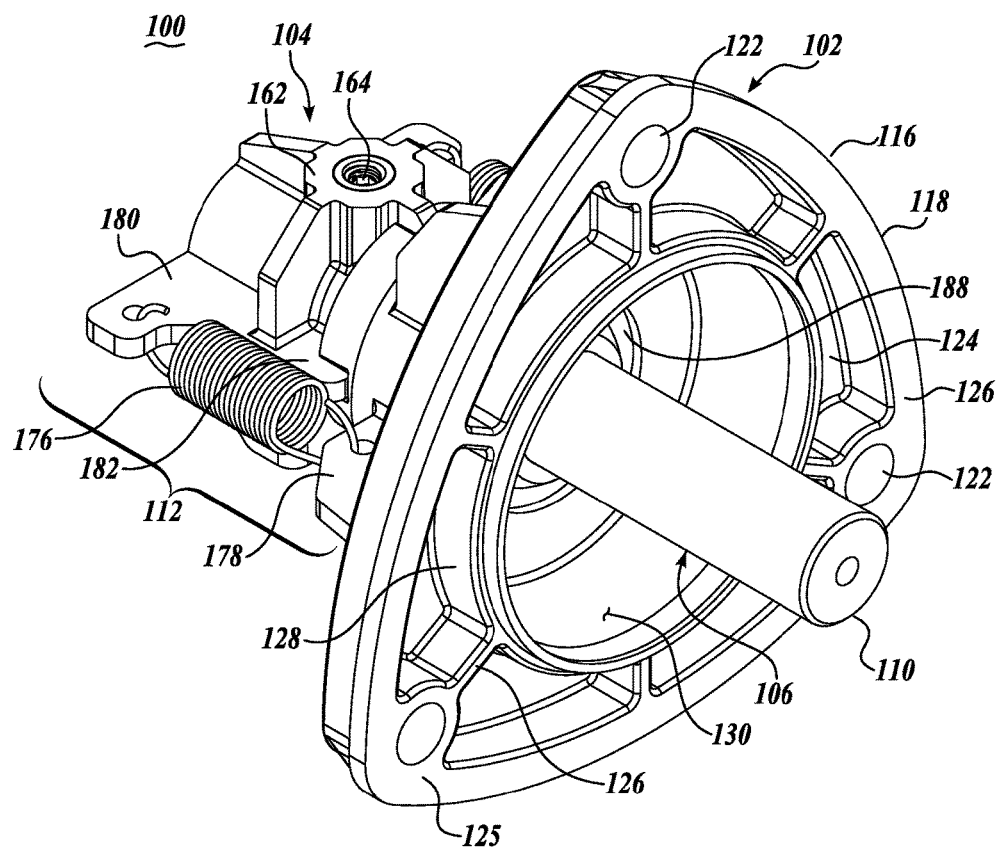
FIG. 6 is an isometric view of a roller brush mounting assembly of a further embodiment of the present disclosure.
Figure 7:
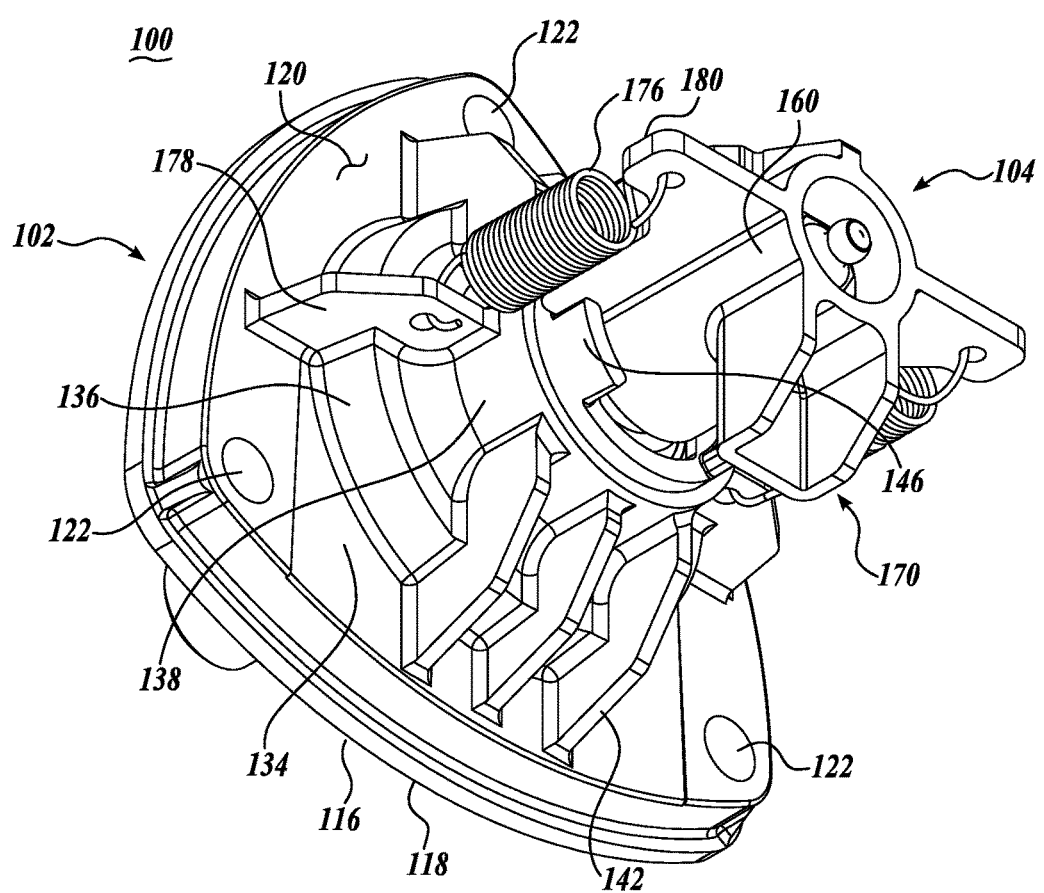
FIG. 7 is an isometric view of FIG. 6 taken from below and from the opposite end of FIG. 6.
Figure 8:
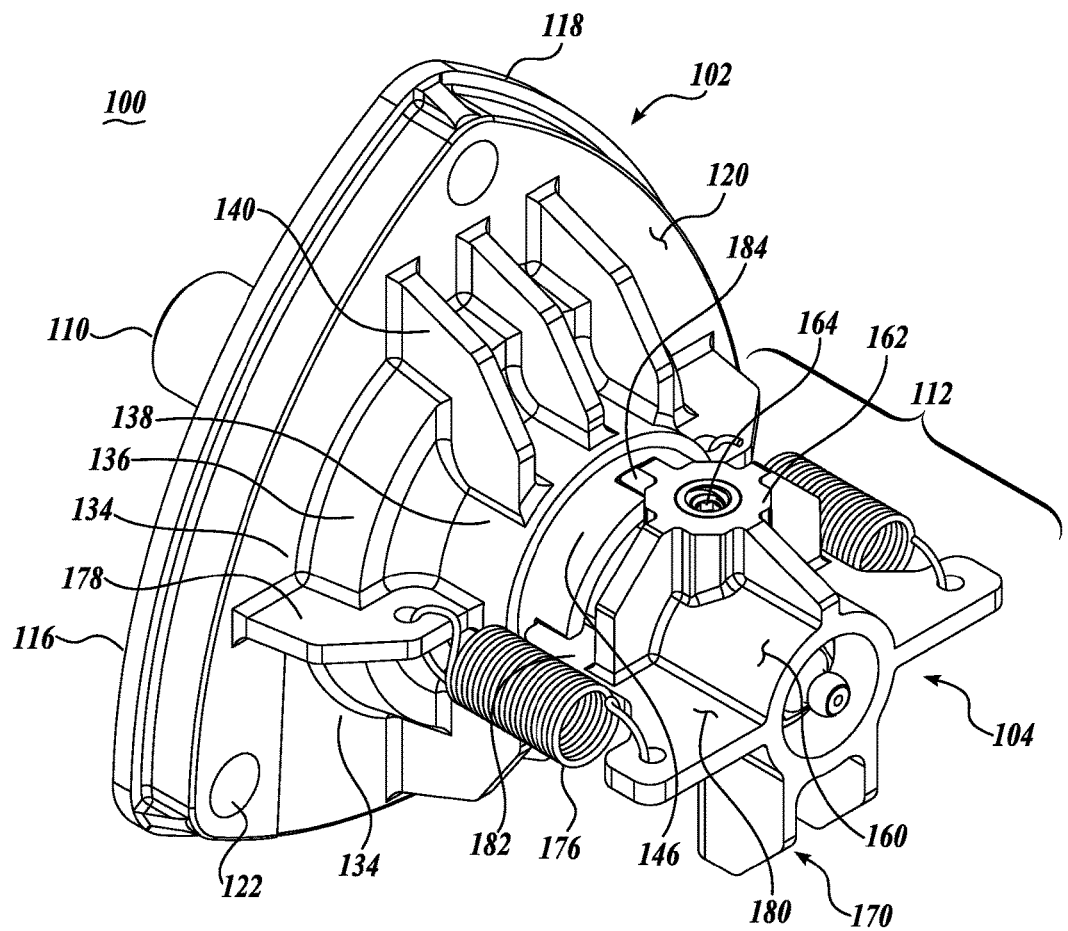
FIG. 8 is a view similar to FIG. 7, but taken from above the roller brush mounting assembly.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "upward," "downward," "right hand," "left hand," "in," "out," "extended," "advanced," "retracted," "proximal," "distal," "above," "below," in front of," "behind," "on top of," and "beneath." These references and other similar references with respect to direction, position, location, etc., in the present application are only to assist in helping describe and understand the present invention and are not intended to limit the present invention to these directions, positions, locations, etc.

The present application may include modifiers such as the words "generally" or "substantially." These terms are meant to serve as modifiers to indicate that the "dimension," "shape," or other physical parameter, in question need not be exact, but may vary as long as the function that is required to be performed can be carried out. For example, in the phrase "generally circular in shape," the shape need not be exactly circular as long as the required function of the structure in question can be carried out.

In the following description, various embodiments of the present disclosure are described. In the following description and in the accompanying drawings, the corresponding systems assemblies, apparatus and units may be identified by the same part number, but with an alpha suffix. The descriptions of the parts/components of such systems assemblies, apparatus, and units are the same or similar are not repeated so as to avoid redundancy in the present application.

The present disclosure pertains to a mounting assembly 10 for mounting brushes, such as elongate roller brush 12 shown in FIG. 1 on a fruit cleaning apparatus (not shown) for cleaning produce, fruits, and other types of fruit products. In basic form, the mounting assembly 10 includes a mounting housing 14 configured to be mountable on the cleaning apparatus. The mounting housing 14 receives and supports and idle shaft or pin 16 for extending toward a longitudinal end of brush 12 to engage with and rotatably support the brush. In addition, a loader assembly 18 applies a resilient load on the idle shaft 16 in the direction toward the brush 12 while also permitting the idle shaft 16 to retract or otherwise move relative to the mounting assembly 10 in a direction opposite to the direction of engagement of the idle shaft 16 with the brush 12.

As a consequence, the brush 12 can be pushed horizontally toward the mounting assembly 10 causing the brush 12 to disengage from its drive mechanism (not shown) at the opposite end of the brush, thereby allowing the brush to be removed from the cleaning apparatus. Correspondingly, a clean brush may be installed by simply engaging the idle shaft 16 with the adjacent end of the brush 12 and pushing the brush 12 against the idler shaft which retracts a sufficient distance to allow the opposite end of the brush to be engaged with the brush drive mechanism. Once the opposite end of the brush is aligned with the brush drive mechanism, the push tension on the brush is simply released so that the brush drive end is seated on the drive mechanism. The present mounting assembly enables a singular person to quickly install or uninstall brush 12 without having to remove panels of the cleaning apparatus, remove bolts, screws, or other types of fasteners, or otherwise disassemble portions of the brush mounting system or the cleaning apparatus.

The above general components of the mounting assembly 10 are described more fully below, as well as other components and features of the mounting assembly 10.

Referring to the figures, the mounting housing 14 includes a mounting flange portion 20 having a flat mounting surface 22 for mounting the housing 14 to a cleaning apparatus (not shown). Mounting flange portion 20 includes three spaced-apart mounting ears 24 with through holes 26 formed therein through which bolts, screws, or other hardware members can be used to securely attach the mounting housing 14 to the cleaning apparatus. Of course, other structures or methods can be employed to mount the mounting housing 14 on the cleaning apparatus.

The mounting housing 14 also includes a hub portion 28 projecting distally (leftward in FIGS. 1-4). The hub portion 28 has a first, larger diameter section adjacent the mounting flange 20 and a second, reduced diameter section in the distal direction, the direction away from the mounting flange 20. An insert cavity 30 is formed in the interior of the mounting flange 20 and adjacent hub portion 28 to allow the brush end hub 32 to be pushed into the insert cavity during assembly and disassembly of the brush 12, as noted above and as more fully described below. A bore or through hole 40 extends centrally through the hub portion 28 of the mounting housing for receiving therein the idle shaft 16. The through hole 40 is sized to enable the idle shaft 16 to slide longitudinally within the through hole. The idle shaft 16 is in turn sized to engage within a blind bore 42 formed in an insert 44 engaged within the adjacent brush end hub 32. The projecting end 46 of the idle shaft 16 bottoms against the end of the blind bore 42.

The mounting housing 14 is, overall, generally circular in shape to facilitate the manufacture thereof. However, the mounting housing can be in other overall shapes to still perform the functions described herein.

The standout of the idle shaft 16 relative to the mounting housing 14 in the direction toward the brush 12 may be adjusted by the position selected for a stop structure in the form of a retainer 48 along the length of the idle shaft 16. As shown in FIGS. 1 and 4, idle shaft 16 is constructed with a plurality of circular grooves 50 spaced along its length, with the grooves sized to received retainer ring 48 therein. Referring specifically to FIG. 4, the stop/retainer is in the form of a retaining ring 48 that abuts against the adjacent face 52 of the mounting housing hub to control the standout of the idle shaft 16. This enables the idle shaft 16 to be positioned properly relative to the brush end hub 32 so that the idle shaft bottoms against the end of the blind bore 42 when the brush 12 is in stalled position. It will be appreciated that the stop/retainer 48 can be placed in any of the grooves 50 depending on the depth of the blind bore 42.

The idle shaft 16 is nominally urged or loaded in the direction toward the brush end hub 32 by a loader compression spring 60 which, at its proximal end, pushes against the retaining ring 48 and, at its distal end, pushes against the end wall 62 of a loader housing 64. The loader housing 64 is generally cylindrical in shape with end wall 62 at its distal end. A central opening is formed in the end wall 62 through which idle shaft 16 projects distally. The loader housing 64 extends into a counter bore formed in the distal end of hub portion 28 and is attached to the hub portion by a bayonet-type connection. In this regard, L-shape slots 70 are formed diametrically opposite to each other in the reduce diameter portion of the hub portion 28. A pair of diametrically opposite pins 72 extend radially outwardly from the outer surface of the proximal end of the loader housing 64 to engage slots 70, whereupon the loader housing 64 can be rotated to enable the pins to bottom against the end portions 74 of the slots, see FIG. 3. Clearance for the pins 72 in the interior (counter bore) of the hub portion 28 is provided by radial grooves 76 formed in the counter bore (see FIG. 5). It will be appreciated that when the loader housing 64 is assembled with the mounting housing 14 and the pins 72 seated against the slot ends 74, a load is applied to the loader housing 64 by the spring 60 which causes the loader housing to remain securely engaged with the mounting housing 14.

Of course, other methods and systems may be utilized to assemble the loader housing 64 with the mounting housing 14, including by using threads so that the loader housing 64 may be screwed into engagement with the mounting flange 20. Also, it will be appreciated that other means can be utilized to apply a resilient load on the idle shaft 16 in place of spring 60, for example, by use of a bellows arrangement.

As shown in FIG. 4, a longitudinal bore 80 extends through the length of the idle shaft 16 to receive and store therein a lubricant, which may include a grease component. To this end, a grease fitting 82, such as a Zerk fitting, is installed in the distal end of the idle shaft 16 through which lubricating grease may be introduced into the bore 80. Of course, other types of lubricants, such as graphite-based lubricants, can be used in addition or in the alternative.

Once the mounting assemblies 10 have been assembled and mounted onto a cleaning apparatus, brushes 12 may be installed by simply engaging the blind bore 42 in the brush hub 32 over the idle shaft 16 and pushing the brush horizontally toward the mounting assembly 10, thereby causing the idle shaft 16 to retract or move in the distal (left hand) direction, compressing spring 60. This enables the opposite end of the brush 12 to be aligned and engaged with a drive mechanism employed to rotatably drive the brush 12. The force of spring 60 on the brush 12 will maintain the brush 12 in secure engagement with its drive mechanism.

To remove the brush 12, the brush need only be pushed horizontally toward the housing 14 until the opposite end of the brush disengages with its drive mechanism so that such opposite end can be swung sufficiently to clear the drive mechanism and thereafter allow the brush to be shifted or moved sufficiently away from the mounting assembly 10 to disengage the idle shaft 16 from the brush end hub 32. It will be appreciated that during the shifting of the brush 12 towards the mounting housing 14, clearance is provided for the brush end hub 32 via the inset cavity 30 formed in the mounting housing 14.

While illustrative embodiments of the present disclosure have been illustrated and described above, it will be appreciated that various changes can be made therein without departing from the spirit and scope of the present invention. In this regard, the mounting housing 14 can be constructed as a singular unit as described above, or can be composed of separate components assembled together to perform the function of the mounting housing 10 described above. Moreover, if constructed as a single unit, the mounting housing 10 can be manufactured by different techniques, including by casting, molding, forging, or machining from stock material.

Also, as mentioned above, other means can be utilized for applying a resilient load on idle shaft 16 in place of the compression spring 60. One example would be to use a bellows arrangement in place of the spring 60. Of course, other types of resilient loading systems or mechanisms may be used instead.

Further, the retaining ring 48 can be of various types, including e-clips, snap rings, or split rings.

In addition, the mounting assembly could be constructed so that the mounting housing and load housing are constructed as a singular unit having a through bore or blind bore for receiving the idle shaft, and also optionally the loader spring, therein.

In addition, rather than forming the idle shaft 16 with a plurality of grooves for receiving a retainer therein which dictates the standout of the idle shaft from the mounting housing, other means can be used to control the standout of the idle shaft. For example, idle shafts of different lengths can be provided to correspond to the various depths of the blind bores formed in the ends of the roller brushes.

A further embodiment of the present disclosure is illustrated in FIGS. 6-17. Referring initially primarily to FIGS. 6-10, a mounting assembly 100 includes in basic form a mounting flange 102 and an end cap 104 cooperating with the mounting flange to support an idle shaft 106 which is engageable within the blind bore 42 formed in an insert 44 engaged within the adjacent end hub 32 of the roller brush 12, as shown in FIGS. 1 and 2. An interface 108 (FIGS. 14-17) functions to mount the idle shaft 106 to the mounting flange 102 and allow the idle shaft proximal end 110 to tilt upwardly when engaging into and disengaging from the blind hole 42 as described below. In addition, a loader 112 is provided to load or bias the idle shaft proximal end 110 outwardly from the mounting flange 102 and into engagement with the blind hole 42.

The following further describes the construction, cooperation and function of the mounting assembly 100.

The mounting flange 102 is constructed with a generally triangularly shaped flange structure 116 having an outer rim portion 118 defining the perimeter of flange structure and a back face or surface 120. Through holes 122 extend through the back face 120 and outer rim portion 118 at the corners of the flange structure 116 for mounting the flange structure to a cleaning apparatus, not shown. A circular pilot rim 124 projects forwardly from the forward face 125 of the outer rim 118 to help conveniently locate the flange structure 116 with respect to an opening or mounting hole formed in the cleaning apparatus. The pilot rim 124 can be tapered so as to facilitate engagement of the pilot rim within the mounting hole. Radial braces 126 extend outwardly from a backing rim portion 128 of the pilot 124 so as to provide structural integrity for the flange structure.

Figure 9:
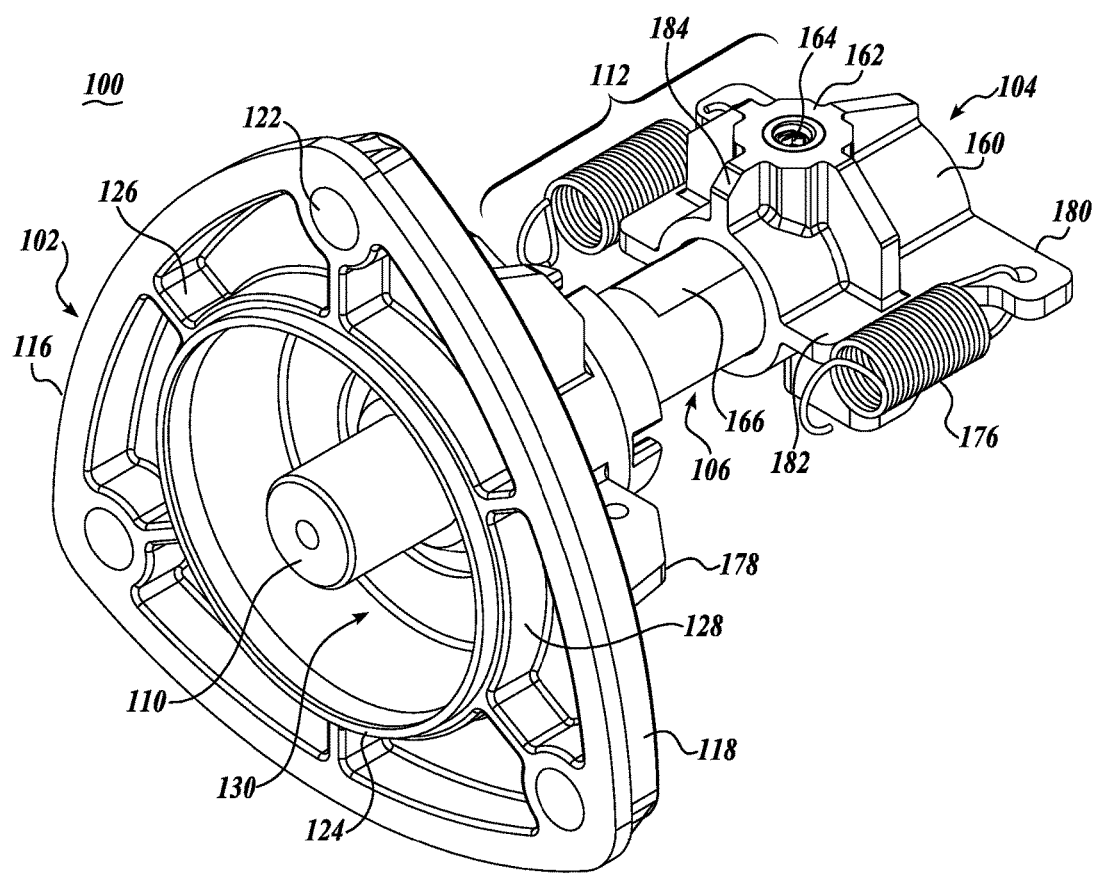
FIG. 9 is an isometric view similar to FIG. 6 but taken from the opposite side of FIG. 6 and with the end cap of the mounting assembly retracted rearwardly with respect to the mounting flange.
Figure 10:
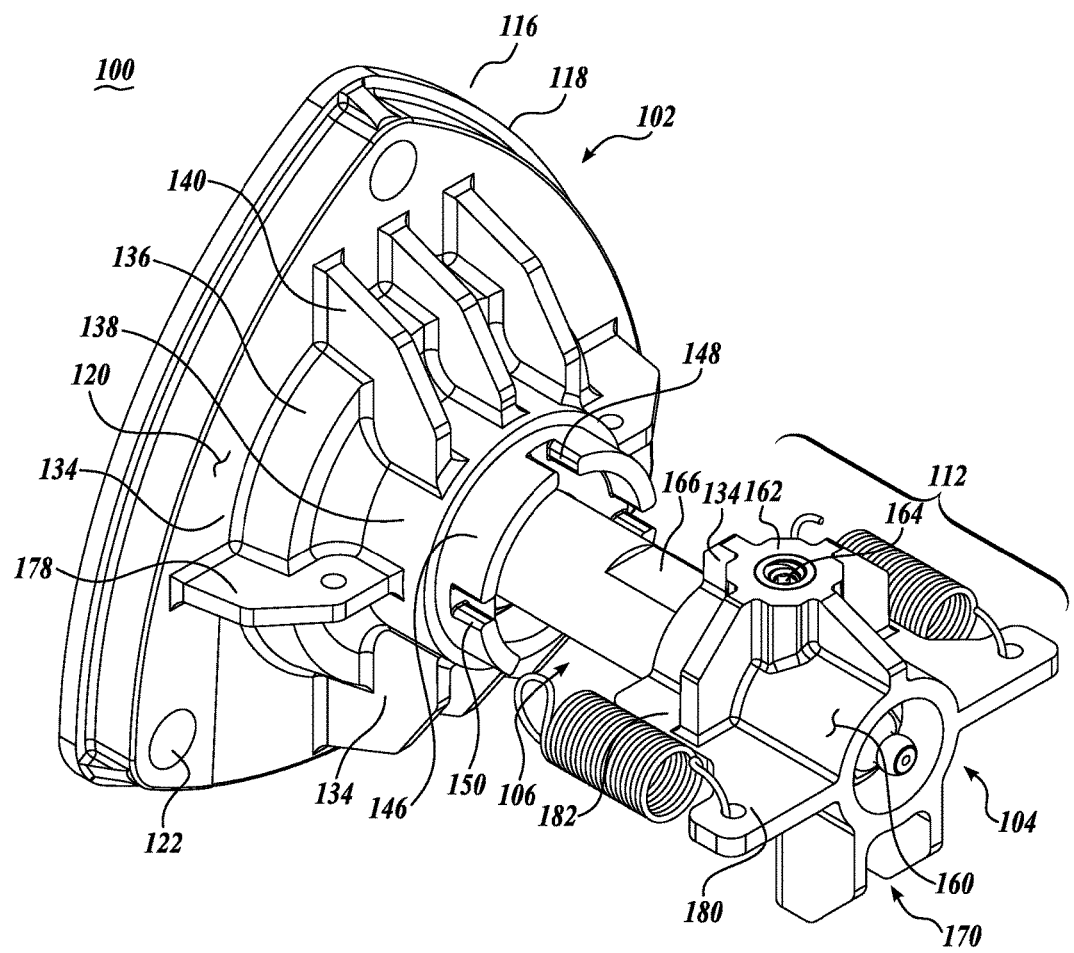
FIG. 10 is a view similar to FIG. 9 but taken from the rear side of the mounting assembly.
Figure 11:
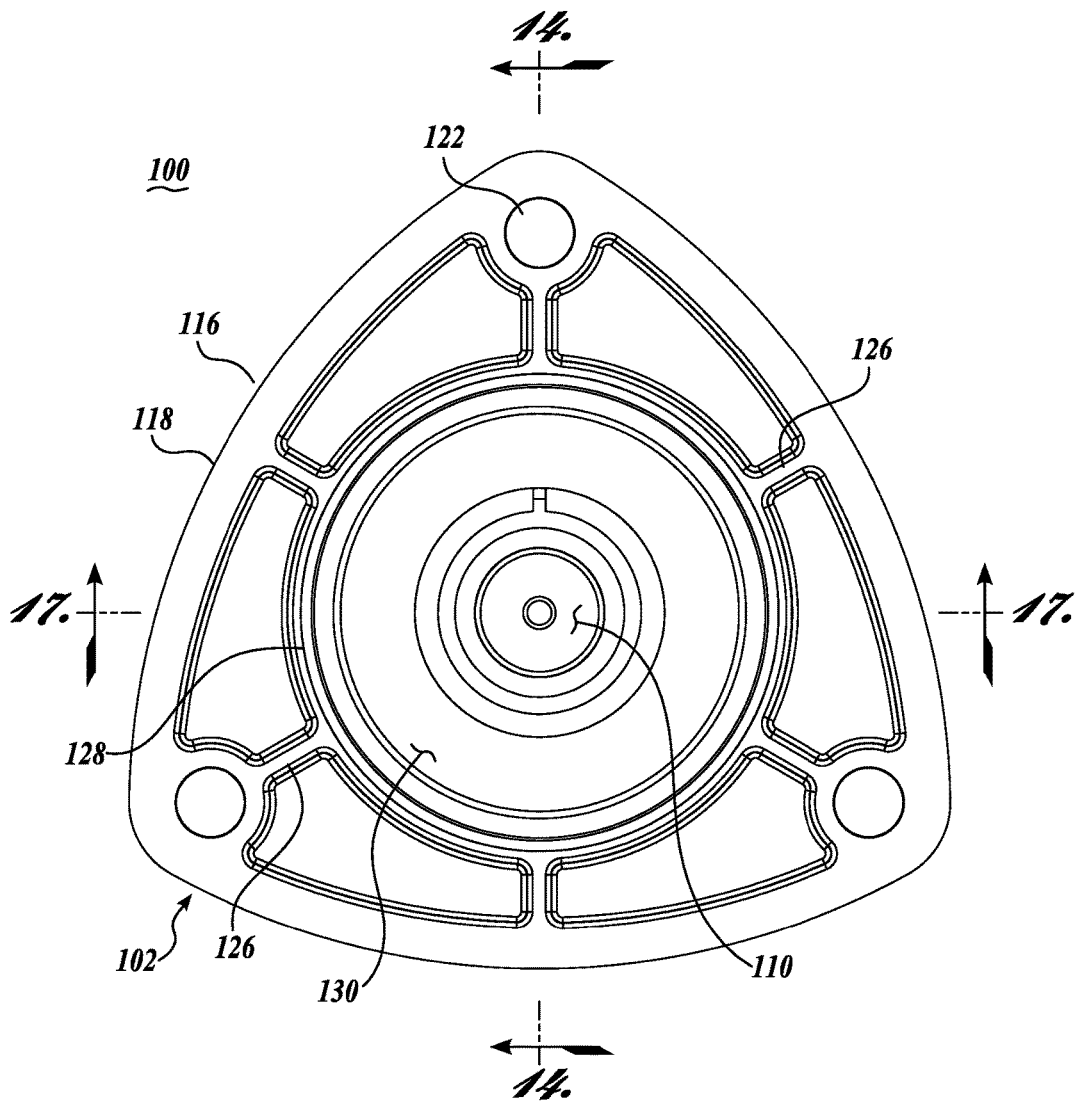
FIG. 11 is an end elevational view of the mounting assembly.
Figure 12:
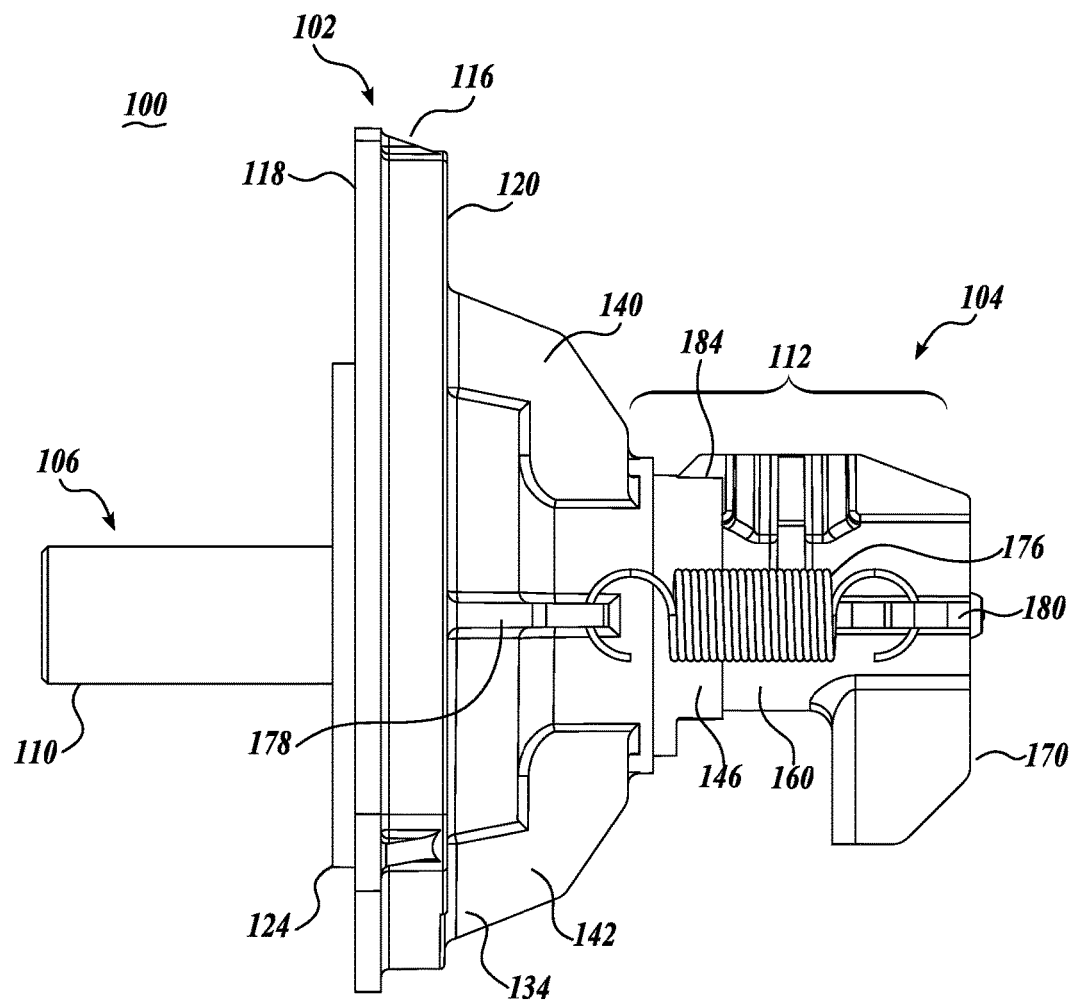
FIG. 12 is a side elevational view of the mounting assembly.
Figure 13:
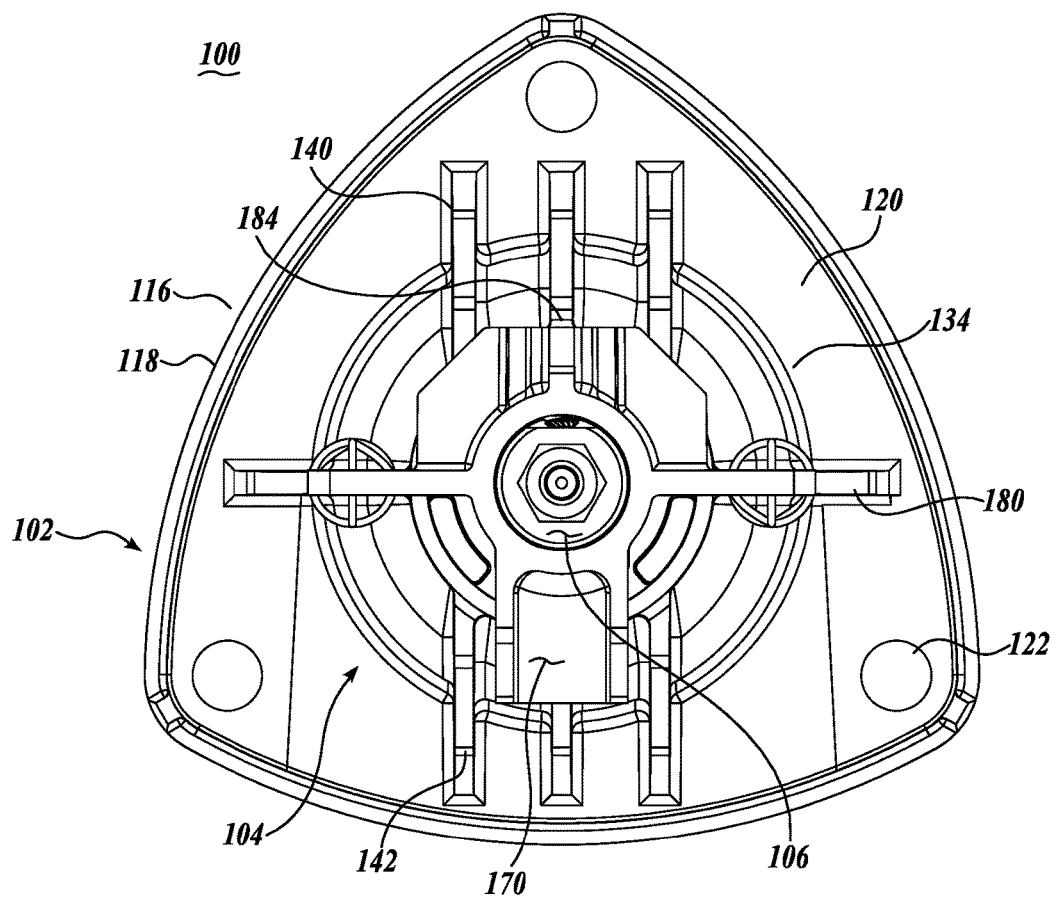
FIG. 13 is an end elevational view of the mounting assembly taken from the opposite end of FIG. 11.

Referring specifically to FIGS. 6 and 9, the mounting flange 102, and more specifically the pilot rim 124 and backing rim portion 128, define a circular cavity 130 which provides clearance for the adjacent end of the roller brush 12 and brush end hub 32 when engaging and disengaging the roller brush from the mounting assembly 100. The cavity 130 corresponds to cavity 30 shown in FIG. 4.

Next, focusing on the back side of the mounting flange 102, a hub structure 134 extends rearwardly from the back face 120 of the flange structure 116. The hub structure 134 includes a larger diameter section 136 adjacent the back face 120 and then a smaller diameter section 138 extending rearwardly from the larger diameter section. Sets of upper braces 140 and lower braces 142 extend rearwardly from the back face 120 to overlie the outer circumference of the larger diameter section 136 and smaller diameter sections 180 of the hub structure so as to provide reinforcement and structural integrity for the hub structure. Although three upper braces 140 and three lower braces 142 are illustrated, the number of braces can be increased or decreased from that shown in the figures. Also, the braces may be placed at other locations about the hub structure 134.

A circular engagement ring 146 projects rearwardly from the smaller diameter section 138. The engagement ring 146 is sized to encircle a portion of the adjacent end of the end cap 104 as described below. In addition, engagement ring 146 is constructed with an upper slot 148 and diametrically opposed side slots 150 for receiving portions of the end cap 104 as described below for the purpose of preventing relative rotation between the mounting flange 102 and end cap 104 while permitting the mounting flange and end cap to disengage and engage with each other along the length of the idler shaft 106. As shown perhaps most clearly in FIGS. 7 and 10, the engagement ring 146 does not form a full circle, but rather approximately 240° of a circle, with the bottom approximately 120° missing. As described below, the reason for this configuration is to enable the proximal end 110 of the idler shaft 106 to tilt upwardly.

The end cap 104 is designed to be engageable with the mounting flange 102 and also functions to urge or bias the idle shaft 106 forwardly with respect to the mounting flange. In this regard, the end cap is constructed with a sleeve portion 160 which is generally in the shape of a longitudinal cylinder to engage over the rearward end of the idle shaft 106. In this regard, a through hole is formed in the sleeve portion 160 for receiving the idle shaft therein. A boss 162 projects upwardly from the sleeve portion 160 for receiving a hardware member 164 to impinge against the top surface 166 of the idle shaft 106 thereby to retain the idle shaft stationary with respect to the end cap. In this regard, the boss 162 may be threaded, or may be fitted with a threaded insert for receiving a set screw or other type of hardware member 164 designed to bear downwardly against the top of the idle shaft. In this regard, the top surface of the idle shaft can be shaved or flattened so as to provide a flat bearing surface 166 for the hardware member 164. Optionally, detents or other depressions could be formed on the idle shaft top surface 166 so as to define incremental relative locations between the idle shaft and the end cap.

Reinforcing braces radiate outwardly from the boss 162 to intersect with sleeve portion 160 to enhance the structural integrity of the end cap. Also, a finger tab 170 extends downwardly from beneath the sleeve portion 160 at the rearward end thereof to provide a finger catch or surface for retracting the end cap relative to the mounting flange as described more fully below. The finger tab includes a front wall extending transversely downwardly from the sleeve portion 160 and two spaced apart side walls also extending downwardly from the sleeve portion. The rear edges of the side walls coincide with the rearward end of the sleeve portion 160.

As noted above, a loader 112 is provided for urging the idle shaft 106 forwardly relative to the mounting assembly 100. To this end, the loader 112 includes extension springs 176 extending between the mounting flange 102 and end cap 104 to urge the end cap toward the mounting flange, and thereby also urging the idle shaft 106 in the forward direction. The extension springs 176 extend between lateral mounting tabs or braces 178 extending horizontally with respect to the back side of the mounting flange 102. In this regard, the brace 178 projects from the flange structure back face 120, larger diameter hub section 136, and a smaller diameter hub section 138. A hole is formed in the brace 178 for receiving the adjacent end of the extension spring 176.

The rear end of the extension springs 176 engage through holes formed in the laterally outwardly portions of braces 180 extending diametrically horizontally from sleeve portion 160 of the end cap 104. The braces 180 are scalloped out to provide clearance for the extension springs 176. As noted above, the two extension springs 176 cooperate to urge the end cap 104 forwardly into engagement with the mounting flange 102. As will be appreciated, different size/capacity springs 176 can be utilized to select the load or force acting between the mounting flange 102 and end cap 104. Also, it will be appreciated that springs 176 can be replaced by other actuation members or devices, for example, an elastic band or line extending between the braces 178 and 180. Another substitute for the springs 176 may be a fluid actuator.

Registration between the mounting flange 102 and end cap 104 is achieved by engagement of the forward portions 182 of brace 180 into engagement with side slots 150 of the engagement ring 146 identified above. Similarly, forward, upright brace 184 projecting forwardly from boss 162 engages within top or upper slot 148 of the engagement ring 146. It will be appreciated that during the engagement of the brace portions 182 within the side slots 150 and the forward brace 184 within the top slot 148, relative rotation is prevented between the mounting flange 102 and end cap 104 about the longitudinal axis of the idle shaft. Moreover, during such engagement, the engagement ring 146 encircles the corresponding portion of the forward end of the sleeve portion 160 so as to provide a protective closure between the mounting flange and the end cap.

As noted above, an interface 108 is employed between the idle shaft 106 and the mounting flange 102. Referring specifically to FIGS. 14-17, the interface 108 in one aspect of the present disclosure may be in the form of a spherical bearing assembly 188 composed in part of an outer ring 190 seated within a counter bore formed in flange structure 116. The counter bore extends rearwardly from the cavity 130. The spherical bearing assembly 188 also includes an inner ring or ball 192 having a central through hole for receiving the idle shaft 106. The inner ring 192 has a curved outer surface defining a portion of a sphere to match the curved inner surface of the outer ring 190 thereby to enable the idle shaft 106 to swivel or pivot relative to the flange structure 116.

Figure 14:
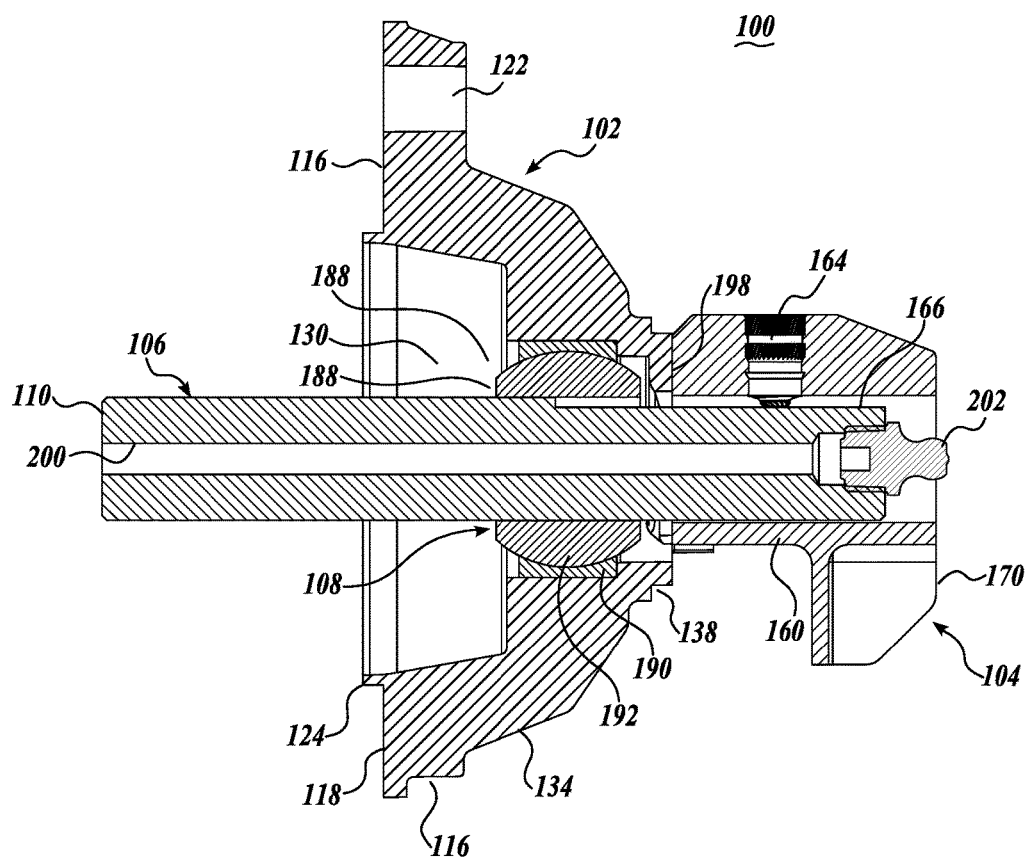
FIG. 14 is a cross-sectional view of the mounting assembly taken along lines 14-14 of FIG. 11.
Figure 15:
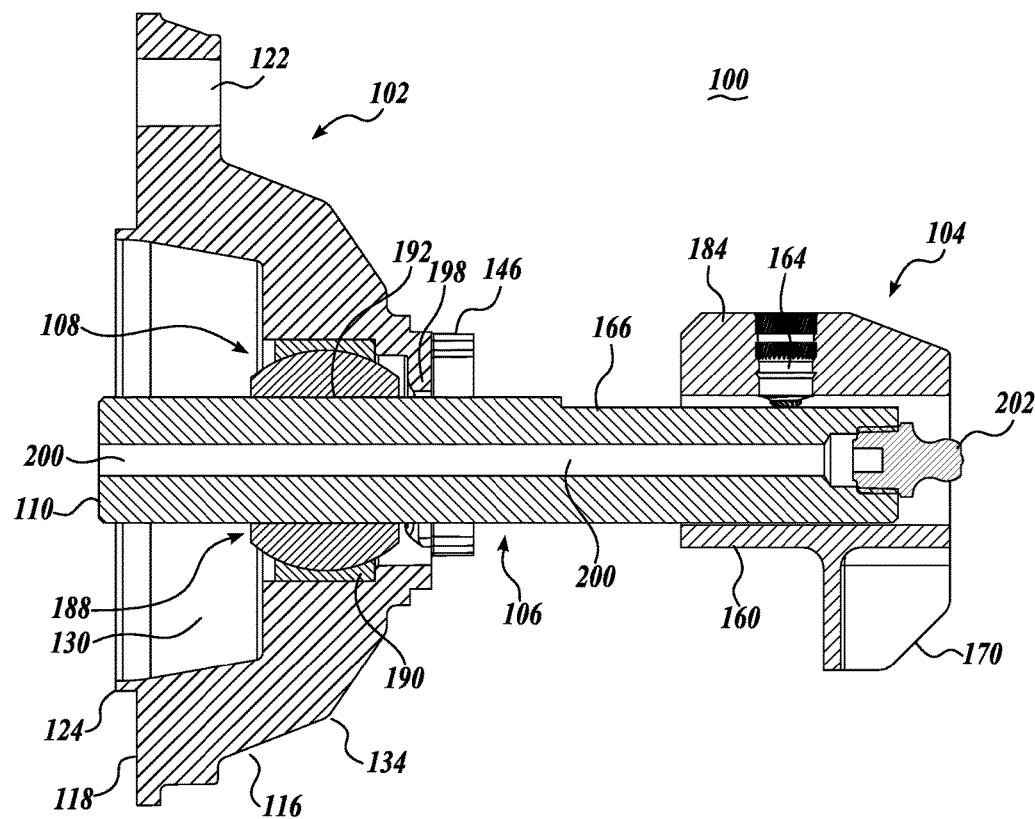
FIG. 15 is a view similar to FIG. 14 but with the end cap retracted rearwardly with respect to the mounting flange.
Figure 16:
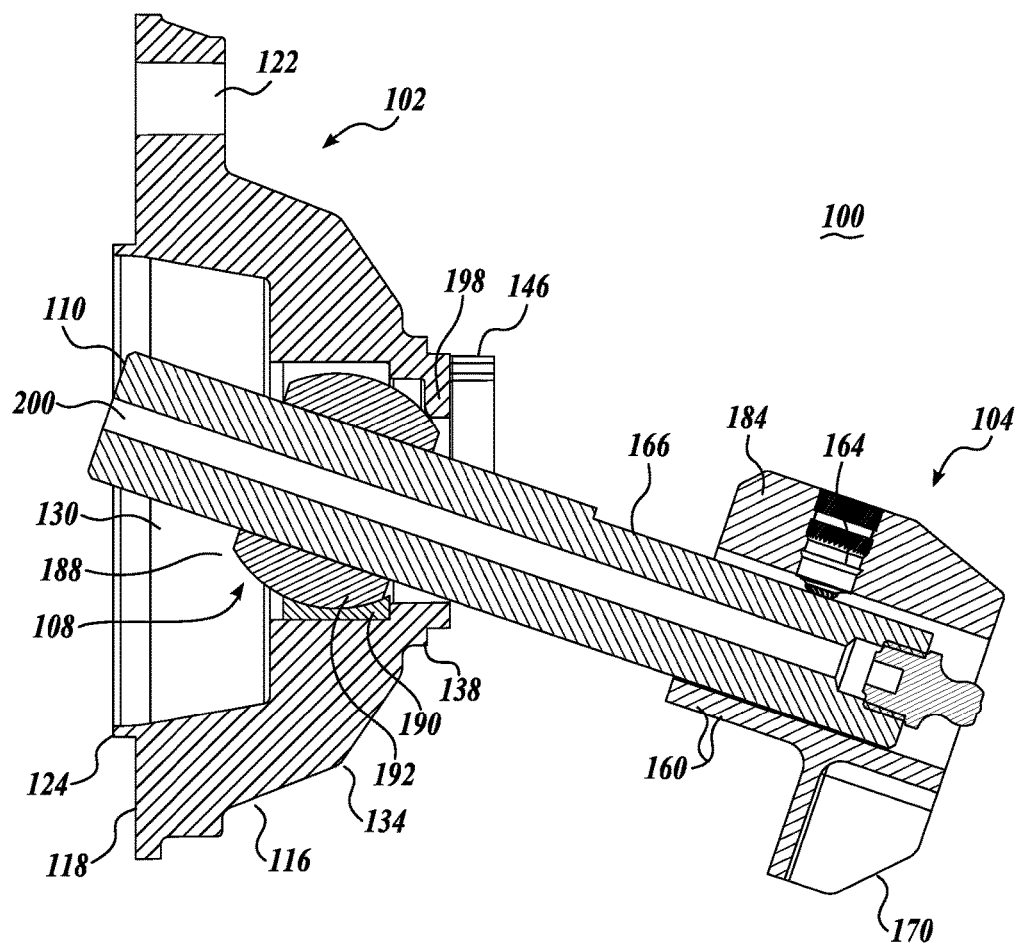
FIG. 16 is a view similar to FIG. 15, but with the proximal end of the idler shaft tilted upwardly.
Figure 17:
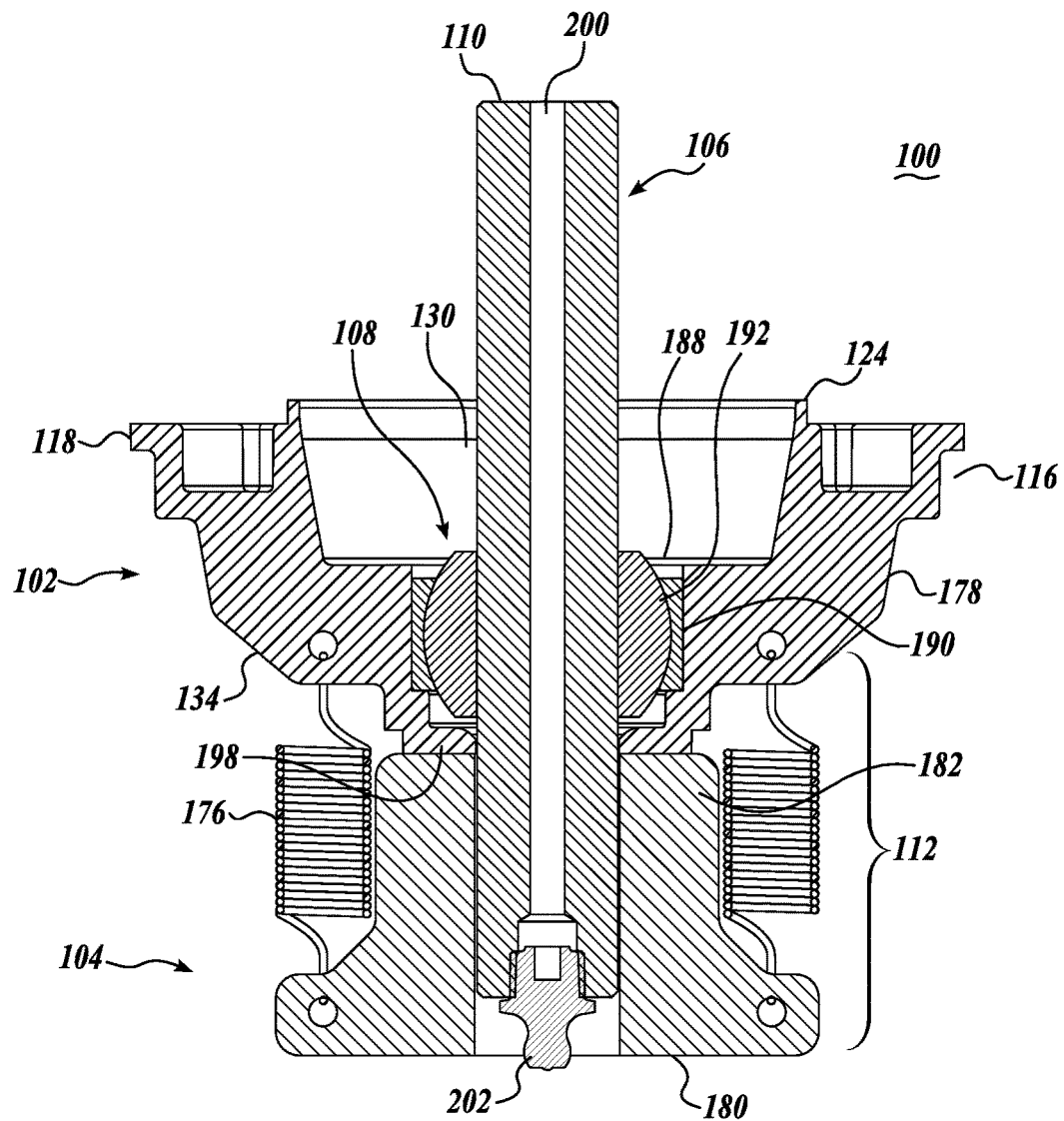
FIG. 17 is a cross-sectional view of the mounting assembly taken along lines 17-17 of FIG. 11.

Referring to FIGS. 14, 15 and 16, the swivel or pivoting of the idle shaft is limited to the upper direction of the proximal end 110. This is accomplished by providing a radially inwardly directed abutment wall 198 in the reduced diameter section 138 of the hub structure encircling the idle shaft 106 except at the location beneath the idle shaft. This absence of the abutment wall 198 beneath the idle shaft permits the portion of the idle shaft behind the spherical bearing assembly 188 to tilt downwardly until bottoming on the internal diameter of the small diameter section 138. Correspondingly, the idle shaft is prevented from swiveling laterally or tilting downwardly by the abutment wall 198. As will be appreciated, the ability to tilt the proximal end 110 of the idle shaft 106 upwardly, when the end cap is retracted, facilitates the engagement of the idle shaft proximal end 110 with the blind hole 42 and also facilitates the disengagement of the idle shaft from the blind hole.

As with the mounting assembly 10, a longitudinal bore 200 extends through the length of the idle shaft 106 to receive and store therein a lubricant, which may include a grease component. To this end, a grease fitting 202, such as a Zerk fitting, is installed in the distal end of the idle shaft 106 through which lubricating grease can be introduced into the bore 200. Of course, other types of lubricants, such as graphite-based lubricants, can be used in addition or in the alternative.

Once the mounting assemblies 100 have been assembled and mounted onto a cleaning apparatus, brushes 12 can be installed by simply engaging the blind bore 42 in the brush hub 32 over the idle shaft 106. To assist in this engagement, the brush hub 32 can be pushed against the proximal end 110 of the idle shaft thereby to retract the idle shaft. Once the idle shaft has been retracted in this manner so that the braces 182 and 184 clear the slots 150 and 148, the idle shaft can be tilted upwardly thereby to assist in engaging the hub 32 over the idle shaft. Once the idle shaft is sufficiently retracted, the opposite end of the brush can be aligned with and engaged with its drive mechanism used to rotatably drive the brush 12. Once the opposite end of the brush is aligned and engaged with its drive mechanism, the end cap 104 is reseated within the mounting flange 102 thereby to position and support the idle shaft 106 in horizontal orientation. The forces of the springs 176 on the brush 12 will maintain the brush 12 in secure engagement with its drive mechanism as well as maintain the end cap 104 in secure engagement with the mounting shaft 102.

To remove the brush 12, the brush need only be pushed horizontally toward the mounting flange 102 until the opposite end of the brush disengages with its drive mechanism so that such opposite end can be swung upwardly sufficiently to clear the drive mechanism and thereby allow the brush to be shifted or moved sufficiently away from the mounting assembly 110 to disengage the idle shaft 106 from the brush and hub 132. In this regard, the proximal end 110 of the idle shaft can be titled upwardly to match the upper tilt of the brush 12 thereby facilitating the removal of the brush 12 from its drive mechanism. It will be appreciated that during the shifting of the brush 12 towards the mounting assembly 100, clearance is provided for the brush end hub 32 by the insert cavity 130 formed in the mounting flange 102.

While a further illustrative embodiment of the present disclosure has been illustrated and described, it will be appreciated that various changes can be made therein without departing from the spirit and scope of the present invention. As noted above, in this regard, springs 176 can be replaced with other elastic loading components or assemblies, for example, elastic bands or lines, or replaced with linear or other types of actuators. Further, rather than utilizing a hardware member in the form of a set screw 164 to lock sleeve portion 160 with the idler shaft, other locking systems can be used, including, for example, a cross pin.

Further, the interface 108 is described in the form of a spherical bearing assembly 188 having an inner ring shaped as part of the sphere. However, other types of spherical bearings may be utilized, including a spherical roller bearing.

In addition, the mounting flange 102 can be replaced with a different structure for mounting the mounting assembly 100 to the cleaning apparatus and/or supporting the idler shaft 106.

The embodiments of the invention in which an exclusive property or privilege is claimed are defined as follows:

1. A mounting assembly for mounting a roller brush on a cleaning apparatus, the roller brush having an end structure with a bore of a depth formed in the end structure of the roller brush, the mounting assembly comprising:
   (a) a housing for mounting the roller brush on a cleaning apparatus, the housing comprising:
      a mounting portion configured to be mountable on the cleaning apparatus; and
      a retractable end portion detachably engageable with the mounting portion;
   (b) a shaft attached to the retractable end portion and extending through the mounting portion, the shaft having a proximal end projecting from the mounting portion for engagement with a bore of a brush end structure; and
   (c) a loader loading the retractable end portion toward the mounting portion to urge the proximal end of the shaft to project from the mounting portion.

2. A roller brush mounting assembly according to claim 1, wherein the loader is configured to permit the shaft to retract towards the mounting portion in a direction opposite to the direction that the proximal end of the shaft projects from the mounting portion.

3. A roller brush mounting assembly according to claim 1; wherein the shaft is longitudinal in structure; and
   wherein the loader applies a resilient load on the shaft longitudinally of the shaft in the direction that the proximal end of the shaft projects from the mounting portion.

4. A roller brush mounting assembly according to claim 3, wherein the loader comprises at least one spring acting between the retractable end portion and the mounting portion to urge the shaft toward the brush end structure.

5. A roller brush mounting assembly according to claim 4, wherein:
   the roller brush when engaged with the shaft is moveable with the shaft toward the housing; and
   the at least one spring acts to enable the shaft to retract relative to the housing under the movement of the roller brush toward the housing.

6. A roller brush mounting assembly according to claim 1, wherein the housing has portions defining a recess therein for receiving the brush end structure.

7. A roller brush mounting assembly according to claim 1, wherein the mounting portion comprises a hub section defining a through hole located generally centrally relative to the mounting portion for receiving the shaft therethrough.

8. A roller brush mounting assembly according to claim 1, further comprising an interface disposed between the mounting portion and the shaft, the interface configured to slidably receive the shaft and permit the shaft to swivel laterally relative to the length of the shaft.

9. A roller brush mounting assembly according to claim 8, wherein the interface comprises a bearing seated with the mounting portion, the bearing shaped to swivel about an axis transverse to the length of the shaft.

10. The roller brush mounting assembly according to claim 9, wherein the shaft is restrained to allow the proximal end of the shaft to swivel upwardly but not downwardly.

11. A roller brush mounting assembly according to claim 1, wherein the shaft has portions defining a longitudinal bore extending therethrough, the longitudinal bore adapted to hold lubricant therein.

12. A mounting assembly for mounting a roller brush on a food cleaning apparatus, the roller brush having an end structure with a bore of a depth formed in the end structure of the roller brush, the mounting assembly comprising:
   (a) a housing configured for mounting on a food cleaning apparatus;
   (b) a shaft having a proximal end projecting from the housing toward an end structure of a roller brush, the proximal end engageable with the bore of the end structure of the roller brush;

(c) an interface disposed between the shaft and the housing for supporting the shaft;

(d) a loader associated with the housing to resiliently bias the proximal end of the shaft toward the end structure of the roller brush; and (e) wherein the interface is configured to allow the proximal end of the shaft to tilt for engagement with and disengagement from the end structure of the roller brush.

13. The mounting assembly according to claim 12, wherein the interface comprises a bearing configured to slidably receive the shaft and permitting the shaft to slide longitudinally along its length relative to the rotatable bearing, said bearing pivotable about an axis extending transversely to the length of the shaft.

14. The mounting assembly according to claim 13, wherein the bearing comprises:

an inner ring having a through hole formed therein for slidably receiving the shaft and an outer surface defining a portion of a sphere; and an outer ring supported within the housing and having an inner surface in the form of a portion of a sphere to match the outer surface of the inner ring.

15. The mounting assembly according to claim 12, wherein the housing comprises:

a mounting portion configured for mounting to a food cleaning apparatus, the mounting portion configured to receive and retain the interface therein;

an end cap configured to be detachably secured to the shaft; and the loader resiliently attaching the end cap to the mounting portion thereby to bias the proximal end of the shaft to project from the mounting portion toward the end structure of the roller brush.

16. The mounting assembly according to claim 15, wherein the loader comprises at least one spring extending between the mounting portion and the end cap.

17. The mounting assembly according to claim 15, wherein the end cap is securable to the shaft at selected locations along the length of the shaft thereby to alter the distance that the proximal end of the shaft projects from the mounting portion.

18. The mounting assembly according to claim 15, wherein the mounting portion comprises a flange structure for mounting to the food cleaning apparatus, and a hub portion for receiving the interface.

19. The mounting assembly according to claim 15, wherein the mounting portion and end cap are configured to engage and disengage from each other in a direction along the length of the shaft but preventing the mounting portion to rotate relative to the end cap along an axis extending along the shaft.

20. The mounting assembly according to claim 12, wherein the loader is configured to enable the shaft to retract relative to the housing in a direction away from the end structure of the roller brush.

\* \* \* \* \*